(No Model.) 2 Sheets—Sheet 2.
E. W. RICE, Jr.
SYSTEM OF ELECTRICAL DISTRIBUTION.
No. 372,330. Patented Nov. 1, 1887.
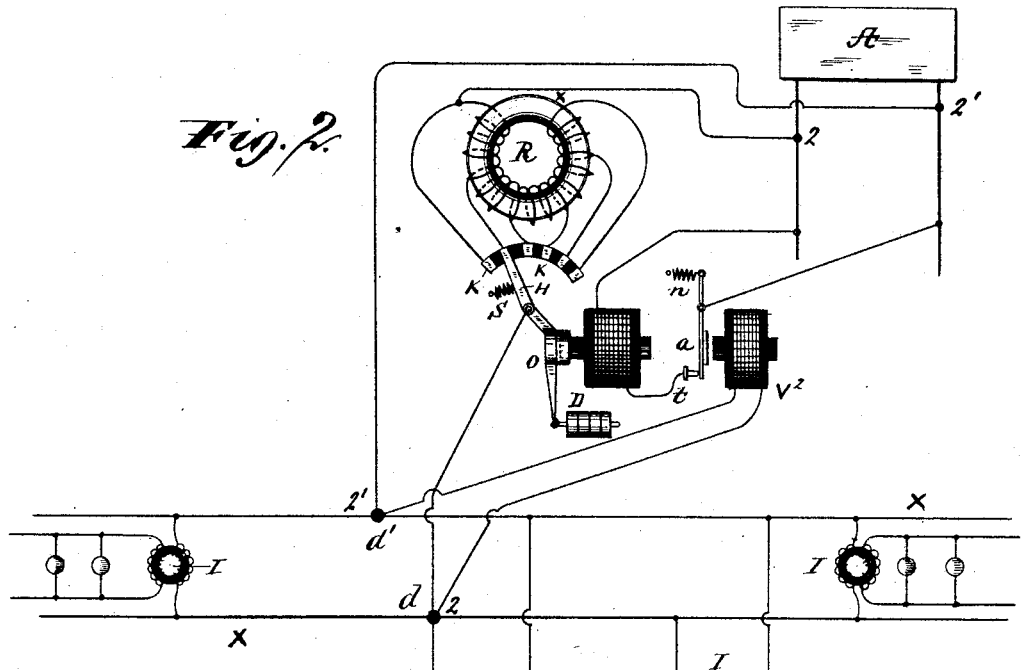
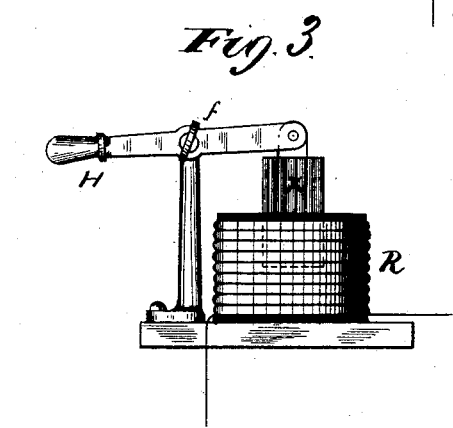
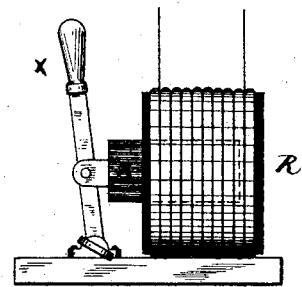
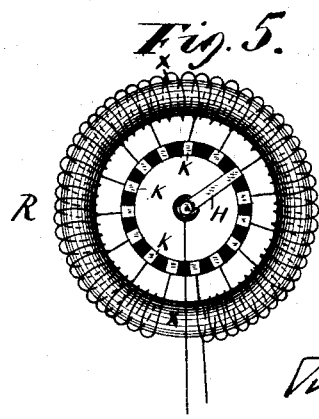
WITNESSES:
Gabriel J. W. Galster
Wm H Cashel
INVENTOR
E. Wilbur Rice, Jr
BY
Townsend & MacArthur
ATTORNEYS

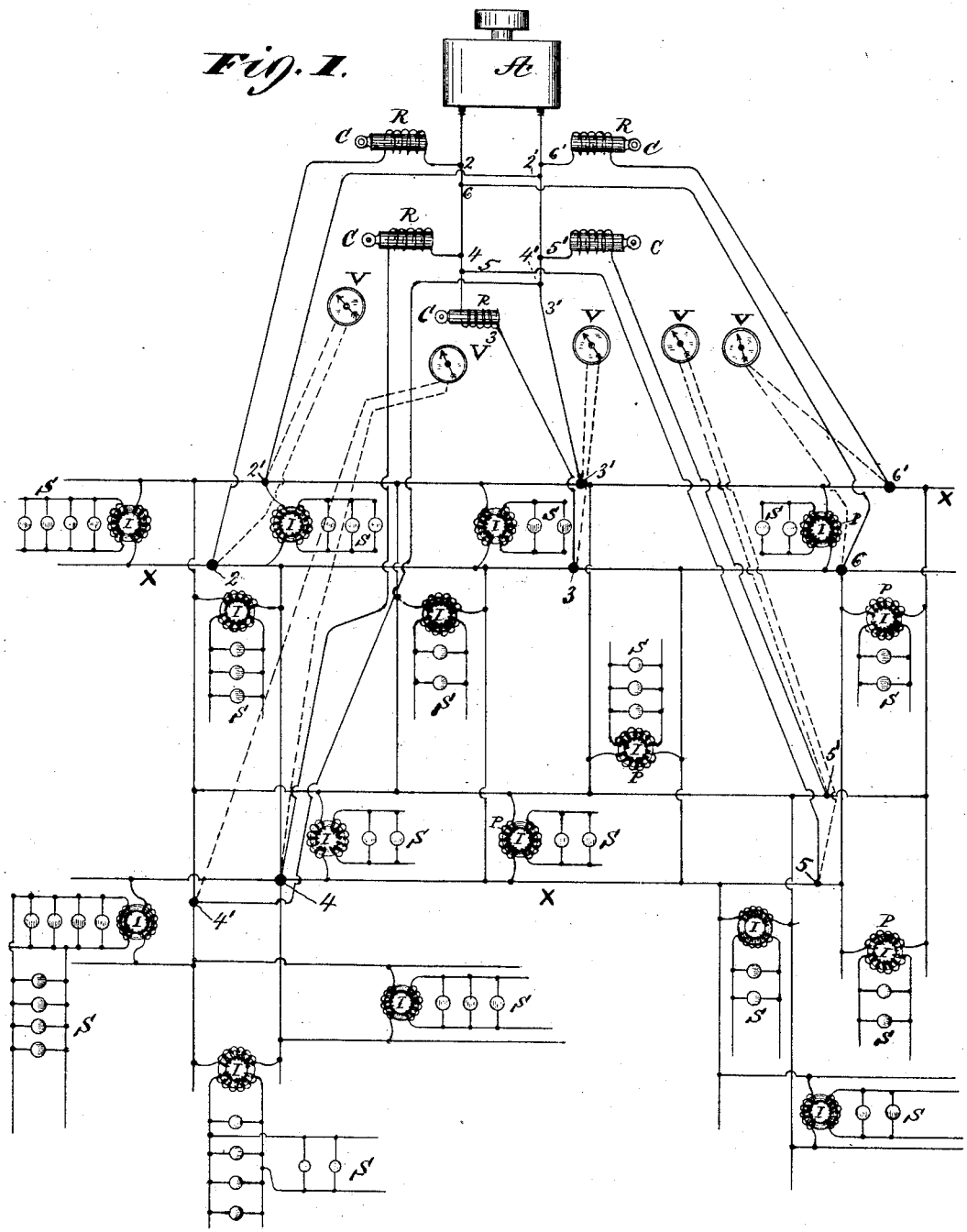

UNITED STATES PATENT OFFICE.

E. WILBUR RICE, JR., OF LYNN, MASSACHUSETTS.

SYSTEM OF ELECTRICAL DISTRIBUTION.

SPECIFICATION forming part of Letters Patent No. 372,330, dated November 1, 1887.

Application filed March 7, 1887. Serial No. 229,909. (No model.)

*To all whom it may concern:*

Be it known that I, E. WILBUR RICE, Jr., a citizen of the United States, and a resident of Lynn, in the county of Essex, and State of Massachusetts, have invented a certain new and useful System of Electrical Distribution, of which the following is a specification.

My present invention relates to an improved method of regulating and supplying the electric current to a large district, where it is important to keep the potential between the terminals of the lamps or other devices practically constant. It is especially adapted for use with those systems in which an alternating or reversed current is used to feed a number of incandescent lamps or other translating devices directly or indirectly through the medium of induction-coils or transformers.

The invention consists in laying throughout the district to be supplied with electricity a set of mains in multiple arc or multiple series and connected, preferably, to form a net-work, and in connecting to such net-work at different points suitable feeders or lines carried back to any suitable source of alternating currents, said feeders or feeder-lines containing means—such as reactive coils—whereby the self-induction or reaction of the feeders may be varied. By varying the reactive power of the coils the current supplied to the net-work by the feeder may be changed and regulated, and thereby compensation made for changes in the load in different parts of the system.

The invention also consists in certain devices whereby a certain definite potential may be automatically maintained at the points where the feeders enter the multiple-arc network. Each feeder is preferably constructed so that its resistance is inversely proportional to the load it is intended to carry and is connected to the mains at the proper points. The reactive coils are adjusted to have a minimum or practically no reactive effect when the load is properly distributed and at its maximum over the system. The potential will then be uniform at all places. If, now, the load be thrown off a portion of the system, as by putting out a number of incandescent or arc lamps, the potential at that portion of the system will be immediately increased. If, however, the self-induction or reaction of that particular feeder be increased by changing the reactive effect of the reactive coil in its circuit, the current delivered by the feeder will be diminished and the potential can be reduced to the proper amount. The same result will follow if the load be thrown off any part of the system and the reactive effect of the proper feeders be varied to suit.

It has been customary hitherto whenever it was desired to vary the amount of current passing over a feeder-line to insert or remove a resistance. Such practice, however, is objectionable and wasteful, as the resistance absorbs the current and uses up energy which might otherwise be fed to the lamps. With my present invention, however, such waste is reduced to practically nothing, as the reactive coils operate by opposing a counter electro-motive force to the current and not by inserting a resistance.

Referring to the drawings, Figure 1 illustrates the application of the invention to a system of electric distribution in which a net-work of wires is employed and the alternating currents are transformed into local circuit-currents. Fig. 2 shows a device for automatically varying the reactive effect of the reactive coils. Fig. 3 shows one form of an adjustable reactive coil. Fig. 4 shows a slightly modified form. Fig. 5 shows still another form of reactive coil.

Referring to Fig. 1, A is any source of alternating currents, and 2 2 2' 2', 3 3 3' 3', 4 4 4' 4', 5 5 5' 5', and 6 6 6' 6' are feeder-circuits connected to each other and to the source of alternating currents A at one end, and connected into a system of multiple-arc mains, X X, at the points 2 2', 3 3', 4 4', 5 5', and 6 6'. Connected from side to side of the mains are induction-coils I I I, &c. The alternating currents from the mains pass through the primary wires of these induction-coils, and the induced currents generated in their secondaries are used to run incandescent lamps S, or other translating devices. Instead of using induction-coils, the incandescent lamps can be connected directly to the multiple-arc mains. By the use of the induction-coils, however, currents of higher potential may be used on the mains and greater economy of distribution be obtained. Connected with each of the feeder-circuits are the reactive coils R R R R, so constructed that their reactive effect or self-induction can be suitably varied either by hand or automatically in such manner as to vary the amount of current supplied by each feeder, and hence the potential at the points fed by each feeder in circuit. V V V are indicators of potential connected, respectively, to the points 2 2', 3 3', &c., where the feeders enter the multiple-arc net-work, which points may be termed the "distributing points," or "distributing centers." These indicators enable the person in charge of the station to tell when the potential at the distributing points is at the proper predetermined amount, and form a convenient indicator to gage as to the amount of adjustment required to be made in each feeder.

In Fig. 2, A is the alternate-current generator; 2 2 2' 2', one of the feeder-circuits; R, an adjustable reactive coil in said feeder-circuit; X X, multiple-arc mains fed by the feeder; I, an induction-coil, and $V^2$ is a device responsive to changes in the potential at $d\ d'$, and consisting of a core of fine iron wire, around which is wrapped a coil of wire whose terminals are connected by metallic wires to $d\ d'$. The magnetic impulses in $V^2$ will therefore vary responsively as the potential at $d\ d'$ rises or falls. The points $d\ d'$ are preferably selected near the points of connection of the feeder-circuit. Opposite the core of $V^2$ is a copper disk, $a$, whose movement closes or opens a cut-out or other switch at $t$, controlling thereby the device M, which is adapted to move the lever H over the contacts K K and change thereby the reactive effect of the coil R by varying the number of coils in circuit.

The device M may be an electro-magnet of any suitable character; but I prefer to employ an apparatus which shall work by the operation of the alternating currents in a similar manner to the devices described in the patent of E. Thomson, hereinafter mentioned. For this purpose I wind the coils of the electro-magnet on a core consisting of a bundle of wires whose polar end is encircled by a ring or annulus of copper, rather massive in character, and carried by the lever H. The repulsion set up between the magnet and ring causes the lever to move so as to change the number of coils of the reactive coil R. The coil of the device M is in a circuit from the alternating source, as indicated, which circuit is controlled by the switch at $t$ in obvious manner. When the flow of current increases in the coil of $V^2$, the closing of the contact at $t$ results and current is caused to flow in the coils of M. Its action, briefly, is as follows: The copper disk $a$ is so adjusted by a spring that contact $t$ is open when normal potential exists at $d\ d'$, and the device M is thus unenergized, and the spring S therefore holds arm H on the last contact K. Coil R is therefore out of circuit, and the minimum of reaction therefore exerted in the feeder 2 2. This condition corresponds to that of the maximum load on the feeder. If the potential at $d\ d'$ increases through throwing off some of the lamps or through an increase of speed of the alternate-current generator A, or other cause, the device $V^2$ is more greatly energized. The copper disk $a$ is repelled, closing the contact $t$ and throwing into action the coils of the device M. The copper disk $o$, opposite the core surrounded by the coils of M, is then repelled, moving the lever H, to which it is attached, so as to throw into action a portion of the wire on R, thus reducing the potential at $d\ d'$. When the potential has again reached normal, the contact at $t$ will be rapidly broken and closed, maintaining the reaction of the coil R at the proper amount. In case more load is thrown off, the same action is further repeated. In case load is thrown on again, the reverse action occurs. The potential at $d\ d'$ is thus kept constant automatically.

The devices M $V^2$, I do not specifically claim as my invention. By these devices a continuous movement of repulsion is produced similar to the movement of attraction which is produced when a continuous current flows through the coils of an electro-magnet.

The disks $a\ o$ are supposed to be of considerable mass and good conductivity, so that the magnetic induction of the core or coils of $V^2$ M may set up in the disks alternating currents of considerable self-induction, whose tendency to prolong themselves will cause them to endure beyond the point of change of polarity in the inducing core or coils. The resultant effect is a continuous tendency of repulsion. Various forms of devices embodying this principle are described in an application of E. Thomson, filed January 26, 1887, and patented May 17, 1887, No. 363,186.

It is apparent that either the inducing element or the element in which the induced currents are set up may be the movable part of the device.

While I have described one specific device which may be employed for securing the adjustment of the counter-electro-motive-force generator, I do not wish to be understood as limiting myself in this respect, since the gist of my invention consists in automatically regulating the alternating currents by means of an adjustable reactive coil or other counter-electro motive-force generator, whose adjustment is controlled by a device of any suitable kind that shall be responsive to changes in the alternating currents.

I have described the device $V^2$ as bringing into action a second device upon which the work of adjusting the reactive coil is imposed; but it will be understood that the adjustment might be effected directly, and also that the device $V^2$ might be employed to bring into action a motor device of any other nature. Devices and combinations of devices suitable for such purpose are commonly employed in regulators for dynamo-electric machines, &c., and many of such appliances will be found suitable to the purposes of my invention, provided, however, that the prime controlling device corresponding to $V^2$ be one suitable for responding to variations in alternating currents.

Fig. 3 shows a form of reactive coil which may be used. R is a coil of wire connected in and forming a part of any of the feeders. X is a core of iron wire attached to the lever H, so that the core X may be inserted into or drawn out of R to any desired extent and firmly clamped by the nut $f$ in the proper position.

Fig. 4 shows the same form of coil with the core X placed horizontally.

In Fig. 5 the core X consists of a bundle of fine iron wires or bundles of sheet-iron, and wrapped around the core are the coils of wire R, wound in sections and connected to the point K of a switch or commutator. One end of a feeder is connected to the lever H and one to the coil R. By moving the lever H, more or less of the coils R may be inserted into the feeder and the reactive power of the coil R be thereby varied.

What I claim as my invention is—

1. In a system of electrical distribution, the combination, with the mains traversing the district to be supplied, of the feeder-circuits connected to said mains at different points, and each carrying an alternating or reversed current, and adjustable counter-electro-motive-force generators placed in said feeder-circuits between the supply-mains and the source of alternating current, as and for the purpose described.

2. The combination, in an electrical distribution system, of mains traversing the district to be supplied and supplying currents in multiple arc, a generator or source of alternating currents connected with said system of mains, feeder-wires connected to said mains at different points, as described, and adjustable counter-electro-motive-force generators in the respective feeder-wires, as and for the purpose described.

3. The combination, with an alternating-current circuit, of an adjustable counter-electro-motive generator, and a controlling or adjusting device therefor responsive to the variations in the alternating current on the circuit, as and for the purpose described.

4. The combination, with mains supplying one or more translating devices with alternating or reversed currents, of an adjustable counter-electro-motive-force generator in the circuit over which the alternating currents are fed to said mains, and a controlling device for governing the adjustment of said counter-electro-motive-force generator, said controlling device being connected to the mains, as described, so as to be responsive to changes in the potential on said mains.

5. The combination, in a system of electrical distribution, of a set of mains supplying induction-coils in multiple arc, feeder-circuits carrying alternating or reverse currents, adjustable counter-electro-motive-force generators in said feeder-circuits, and controlling devices for said generators responsive to changes in the potential of the mains, as and for the purpose described.

6. The combination, with a wire or conductor carrying an alternating current, of an adjustable counter-electro-motive-force generator placed in the circuit of said wire or conductor, and a controlling device therefor, consisting, essentially, of a conductor of low resistance and high self-induction, in which currents are induced by the alternations of current on the circuit, as and for the purpose described.

7. The combination, in a system of electrical distribution, of mains traversing the district to be supplied, feeder-wires connected with said mains at various points and carrying alternating currents, adjustable counter-electro-motive-force generators in said feeder-wires, and controlling devices for said generators responsive to the changes of potential on the mains, and connected to said mains at or near the points where the feeder-wires are joined to the same.

Signed at Lynn, in the county of Essex and State of Massachusetts, this 3d day of March, A. D. 1887.

E. WILBUR RICE, Jr.

Witnesses:
 J. W. GIBBONEY,
 ELIHU THOMSON.